United States Patent [19]

Dietlein et al.

[11] Patent Number: 4,797,446
[45] Date of Patent: Jan. 10, 1989

[54] ADHESION OF SILICONE SEALANT

[75] Inventors: John E. Dietlein, Bay City; Jerome M. Klosowski, Monitor Township, Bay County, both of Mich.

[73] Assignee: Dow Corning Corporaton, Midland, Mich.

[21] Appl. No.: 149,252

[22] Filed: Jan. 28, 1988

Related U.S. Application Data

[63] Continuation-in-part of Ser. No. 508, Jan. 5, 1987, abandoned, which is a continuation-in-part of Ser. No. 787,587, Oct. 15, 1985, abandoned.

[51] Int. Cl.$^4$ .............................................. C08L 83/04
[52] U.S. Cl. ...................................... 524/860; 528/17; 528/33; 528/34; 528/38; 528/901; 427/387; 428/447; 428/450; 428/452
[58] Field of Search ...................... 528/17, 33, 34, 38, 528/901; 524/860; 427/387; 428/447, 450, 452

[56] References Cited

U.S. PATENT DOCUMENTS

| | | | |
|---|---|---|---|
| 3,175,993 | 3/1965 | Weyenberg | 528/18 |
| 3,334,067 | 8/1967 | Weyenberg | 528/17 |
| 3,499,859 | 3/1970 | Matherly | 528/18 |
| 4,483,973 | 11/1984 | Lucas et al. | 528/21 |
| 4,602,078 | 7/1986 | Joseph et al. | 528/34 |

FOREIGN PATENT DOCUMENTS 2137217A 10/1984 United Kingdom .

*Primary Examiner*—Melvyn I. Marquis
*Attorney, Agent, or Firm*—Edward C. Elliott

[57] ABSTRACT

An improved one-part moisture curable silicone sealant is disclosed which bonds cohesively to a wide variety of substrates under a wide variety of exposure conditions. The composition consists essentially of a hydroxyl endblocked polydiorganosiloxane, alkyltrialkoxysilane, titanium catalyst, optional filler, silane of the formula $(MeO)_3SiCH_2CH_2CH_2NHCH_2CH_2NH_2$ in an amount such that there is from 0.1 to 1.0 mole of silane per mole of titanium in the titanium catalyst, and silane of the formula

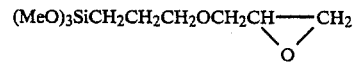

in an amount such that there is at least 25 percent on a molar basis of the amount of the amine functional silane and less than about 5 percent by weight based upon the weight of the polydiorganosiloxane.

17 Claims, No Drawings

ADHESION OF SILICONE SEALANT

This is a continuation-in-part of application Ser. No. 000,508, filed on Jan. 5, 1987, now abandoned, which is a continuation-in-part of application Ser. No. 787,587, filed on Oct. 15, 1985, now abandoned.

BACKGROUND OF THE INVENTION

1. Field of Invention

This invention relates to silicone sealants which cure upon exposure to moisture without releasing corrosive by-products

2. Background Information

One of the types of one component room temperature curing silicone rubbers is that disclosed by Weyenberg in U.S. Pat. No. 3,334,067, issued Aug. 1, 1967. This composition of hydroxyl endblocked polydiorganosiloxane, silane of the formula R'Si(OR")$_3$ and chelated titanium compound is stable in the absence of moisture, but cures upon exposure to moisture. Compositions such as these have been developed into commercial sealants which are promoted for filling openings in buildings to seal them from the weather. A successful sealant for such applications must adhere to the substrate on which it is placed in order to form a reliable seal. Many different types of sealants have been made available with varying degrees of adhesion to various types of substrates such as are found in buildings. Improving the adhesion of such sealants to a wider variety of substrates has been the object of much experimentation.

UK Patent Application No. 2,137,217A published Oct. 3, 1984, discloses a self-bonding alkoxy-functional one-component RTV composition containing alkoxy terminated organopolysiloxane, a silane scavenger, a substituted guanidine curing accelerator, a condensation catalyst which includes titanium compounds, and an adhesion promoter having the formula (R$^1$OO)$_3$—t(R$^1$1$_t$)Si—Z where R$^1$O and R$^1$1 are monovalent hydrocarbon radicals having from 1 to 8 carbon atoms, t varies from 0 to 3 and Z is a saturated, unsaturated or aromatic hydrocarbon residue which may be further functionalized by a member selected from the class consisting of amino, ether, epoxy, isocyanato, cyano, acryloxy, and acyloxy, and multiples and combinations thereof. This invention is also covered by U.S. Pat. No. 4,483,973, issued Nov. 20, 1984.

U.S. Pat. No. 4,602,078, issued July 22, 1986, teaches a two part composition comprising the product obtained by mixing a silanol-terminated polydiorganosiloxane; a silicon compound having at least 3 silicon-bonded alkoxy or alkoxyalkoxy groups in the molecule; a metal or organometal salt of a carboxylic acid; a silane having silicon-bonded alkoxy or alkoxyalkoxy groups and a silicon-bonded group,—R' NHR, in which R' is alkylene and R represents H, alkyl or an aliphatic hydrocarbon group containing at least one amino group; and a silane having silicon-bonded alkoxy or alkoxyalkoxy groups and a silicon-bonded group containing an epoxy group. The composition cures upon mixing of the ingredients to an elastomer having improved adhesion.

Even though methods have been developed for producing improved adhesion of sealants to substrates, additional improvements are desired for increasing the number of substrates that can be successfully adhered by a single sealant to improve the versatility of the sealant.

SUMMARY OF THE INVENTION

An improved one part, moisture-curing sealant of the type produced by mixing hydroxyl or alkoxy endblocked polydiorganosiloxane, alkyltrialkoxysilane, filler, and titanium catalyst, has been developed through the addition of amine-containing trialkoxysilane of the formula (MeO)$_3$SiCH$_2$CH$_2$CH$_2$NHCH$_2$CH$_2$NH$_2$ in an amount such that there is from 0.1 to 1.0 mole of silane per mole of titanium in the titanium catalyst, and an epoxy containing trialkoxysilane of the formula

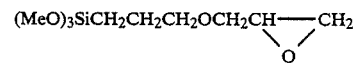

in an amount such that there is at least 25 percent on a molar basis of the amount of amine-containing trialkoxysilane present and less than about 5 percent by weight based upon the weight of the polydiorganosiloxane.

It is an object of this invention to produce an improved one part, moisture curing sealant, having alkoxy functional groups and a titanium catalyst, having improved adhesion to a greater variety of substrates.

DESCRIPTION OF THE INVENTION

This invention is a composition consisting essentially of a product obtained by mixing (A) 100 parts by weight of a hydroxyl or alkoxy endblocked polydiorganosiloxane having a viscosity of between 1.0 and 100 Pa·s at 25° C., the organic groups being selected from the group consisting of methyl, ethyl, propyl, phenyl, and trifluoropropyl, (B) from 0.35 to 9.0 parts by weight of an alkyltrialkoxysilane of the formula RSi(OR')$_3$ where R is a monovalent hydrocarbon radical of from 1 to 4 carbon atoms and R' is an alkyl or alkoxyalkyl radical, (C) from 0.5 to 5.0 parts by weight of titanium catalyst such that there is from 0.05 to 0.4 part of titanium, (D) from 0 to 250 parts by weight of filler, (E) silane of the formula (MeO)$_3$SiCH$_2$CH$_2$CH$_2$NHCH$_2$CH$_2$NH$_2$ in an amount such that there is from 0.1 to 1.0 mole of silane per mole of titanium in (C), and (F) silane of the formula

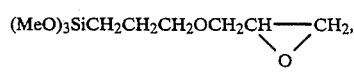

in an amount such that there is at least 25 percent on a molar basis of the amount of (E) present and less than about 5 percent by weight based upon the weight of (A).

Many commercial silicone sealants have been developed based upon the use of a hydroxyl endblocked polydiorganosiloxane, alkoxy functional silane crosslinker, titanium containing catalyst, and filler. The nature of the specific ingredients used is changed depending upon the requirements of the end use. Some applications require an elastomer having a high tensile strength, so a reinforcing type filler is used as an ingredient. Some applications do not require high tensile strength, but require a high elongation so non-reinforcing fillers and chemical chain extenders are used as ingredients. Some applications require that the sealant adhere to the substrate against which it is cured to a great degree. It has been discovered that adhesion of cured sealant to substrates under varying exposure conditions varies a great deal depending upon the composition of the sealant, the nature of the substrate and the conditions under which the adhesion must be maintained. The instant invention is the result of work done to improve the number and type of substrates that could be adhered to successfully by a single composition, of the titanium catalyzed type, particularly when the adhesion must be retained after immersion in water.

The composition of the instant invention contains hydroxyl endblocked polydiorganosiloxane having a viscosity of between 1.0 and 100 Pa.s at 25° C. The organic groups of the polydiorganosiloxane are selected from the group consisting of methyl, ethyl, propyl, phenyl, and trifluoropropyl. The preferred organic group is methyl since this is the most economical at the present time. If solvent resistance is a requirement of the cured elastomer, up to 50 mol percent of the organic groups can be trifluoropropyl groups. The viscosity of the polymer is greater than 1.0 Pa.s at 25° C. because polymers having a lower viscosity do not give satisfactory physical properties. The viscosity of the polymer is less than 100 Pa.s at 25° C. because polymers having higher viscosities, for example, 1,000 Pa.s at 25° C. result in compositions which are too viscous to be readily extruded from the common storage tubes used for sealants. The polymer can be a homopolymer or a copolymer or mixtures. The viscosity of the polymer is the average viscosity of the polymer or polymers used as (A). The polymer can have a wide variation of molecular weights of individual molecules present as long as their average viscosity is within the claimed range. The preferred viscosity is from 40 to 60 Pa.s at 25° C.

The hydroxyl endblocked polydiorganosiloxane (A) can be replaced entirely or in part by an alkoxy endblocked polymer such as is produced in situ when (A) and (B) are mixed. (A) can also be replaced in part or entirely by a trialkoxysilylethylene ended polydiorganosiloxane such as is obtained by reacting a hydrogen endblocked polydiorganosiloxane with aliphatic-containing alkoxysilanes in the presence of platinum catalyst. Such polymers are shown in U.S. Pat. No. 3,175,993, issued Mar. 30, 1965, which patent is hereby incorporated by reference to show such polymers and their method of manufacture. (A) can also be replaced in part or entirely by a trialkoxysilyl endblocked polymer having a divalent hydrocarbon radical or combination of divalent hydrocarbon radical and siloxane radicals connecting the endblocking group to the remainder of the polymer. Such polymers are disclosed in U.S. patent application, Ser. No. 835,814, filed Mar. 3, 1986, which application is hereby incorporated by reference to show the usable polymers and their method of manufacture.

The alkyltrialkoxysilane (B) is the crosslinking agent of the average formula RSi(OR')$_3$ where R is a monovalent hydrocarbon radical of from 1 to 4 carbon atoms and R' is an alkyl or alkoxyalkyl radical. Suitable silanes or mixtures of silanes are well-known in the art. R is preferably methyl, vinyl, or ethyl, with methyl being the most preferred radical. R' is preferably methyl, ethyl, or methoxyethyl, with methyl being the most preferred radical. The crosslinker (B) is used at a level of from 0.35 to 9.0 parts by weight. In order to cure properly, the composition requires at least 2 mols of crosslinker per mol of hydroxyl in the polymer (A). Commercially, it has been found that it is preferred to use up to 5 times excess of crosslinker to provide for the reaction of some of the crosslinker with incidental hydroxyl groups present in the composition, for example on the filler, and to react with moisture which may be present in the composition when it is produced or which may gain access to the composition during storage. When (A) and (B) are combined, there is a reaction which replaces the hydroxy endblock group with an alkoxy endblock group as the alkoxy crosslinker spontaneously reacts with the hydroxyl group to give the new endblock group and an alcohol byproduct.

The titanium catalyst (C) is selected from the well-known titanium catalysts used in silicone moisture-curing sealants such as tetrabutyltitanate, tetraisopropyltitanate, and the chelated titanium compounds such as those disclosed in U.S. Pat. No. 3,334,067, issued Aug. 1, 1967 to Weyenberg, and U.S. Pat. No. 3,499,859, issued Mar. 10, 1970 to Matherly, both of which are incorporated by reference to show suitable titanium catalysts and their method of manufacture. A preferred catalyst is 2.5-diisopropoxy-bis-ethylacetoacetate titanium.

The composition of the present invention can be modified by the incorporation of various reinforcing and extending fillers. Suitable fillers are those well-known fillers used in silicone polymers such as fume silica, precipitated silica, diatomacious earth, calcium carbonate, zinc oxide, titanium oxide, iron dioxide, and ground quartz. The fillers may be untreated or treated with surface treatments either before addition to the composition or treated in situ during the manufacture of the composition. Among the most useful fillers are calcium carbonate alone, or mixed with fume silica. The preferred amount of filler is from 10 to 200 parts by weight. From 1 to 20 parts of reinforcing filler is preferred and from 1 to 200 parts of extending filler. A combination such as from 5 t 15 parts of reinforcing filler and from 150 to 200 parts of extending filler is most preferred.

Ingredients (E) and (F) are added to the composition to aid in adhering of the cured composition to a wide variety of substrates. It was found that the addition of an additive to improve adhesion, such as (E) (MeO)$_3$SiCH$_2$CH$_2$CH$_2$NHCH$_2$CH$_2$NH$_2$ was not satisfactory in many cases. For example, when a composition containing (E) as adhesion additive was cured in contact with ACT reflective glass or Duranar coated aluminum, there was zero percent cohesive failure when the sealant was peeled off the substrate after 14 days at room temperature. When immersed in water for 7 days and then tested for adhesion, the sample showed zero percent cohesive failure when tested against an anodized aluminum substrate. It was also found that the amount of (E) which can be added is critical in this system. The amount is restricted to an amount such that there is from 0.1 to 1.0 mole of silane per mole of titanium in the catalyst. When too much (E) is added in relation to the amount of titanium present, the sealant will no longer cure properly. It was also found that prereacting the amine funtional silane (E) and the epoxy functional silane (F) gave a new product which allowed the use of larger amounts on the amine functional silane to be present. This allowed the use of higher amounts of adhesion promoter to be used without suffering from a loss of cure in the sealant, resulting in sealants which cured properly and had improved adhesion to a wide variety of sufstrates.

The use of an additional epoxy functional silicon fluid to improve adhesion was evaluated. It was unexpectedly found that of the epoxy functional fluids evaluated only (F)

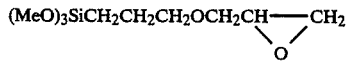

was successful in providing 100 percent cohesive bonding to ACT reflective glass. The epoxy-functional fluid, additive (B), in Example 1, gave 100 percent cohesive failure to Duranar fluorocarbon finished aluminum at the 1 percent level, but not at the 0.5 percent level. Thus (F) was unique in its ability to improve adhesion to both ACT reflective glass and Duranar fluorocarbon treated aluminum, particularly at lower use levels.

The amount of ingredient (E) is such that there is from 0.1 to 1.0 mole of silane per mole of titanium in (C). If less than this amount is used, the improved adhesion is minimal. More than this amount can not be used, because the sealant does not cure properly. The upper levels of (E) can only be used when mixed with (F), because the cure will not proceed properly unless there is at least 25 percent on a molar basis of (F) based upon the amount of (E) present. The prefered amount of (E) is from 0.1 to 0.75 mole of (E) per mole of titanium in (C).

The amount of ingredient (F), the epoxy functional silane, is such that there is at least 25 percent on a molar bosis, based upon the amount of (E) present and less than about 5 percent by weight based upon the weight of (A), the polydiorganosiloxane. If less than these amounts is used, the improved adhesion is minimal. More than this amount can be used, but it is unnecessary because this amount already gives 100 percent cohesive adhesion. The preferred amount of (F) is at least 0.75 mole per mole of (E) and less than 2 parts by weight of (A).

A preferred method of adding (E) and (F) is by mixing them together before addition to the rest of the ingredients. They can be mixed together, then added, or mixed together, aged a few hours or days to allow complete reaction, and then added, or they can be reacted with heat and then added. A preferred method is the slow addition of either silane into a container of the other silane which has been heated, as to a temperature of from 50 to 100° C. The preferred ratio of (E) to (F) is 1 to 1 on a mole basis.

Additional ingredients such as flame retardants, stabilizing agents, plasticizers, and pigments may be added as long as they are evaluated to ensure that they do not adversely effect the adhesion of the composition.

The composition of the present invention is produced by mixing, in the absence of moisture, ingredients (A), (B), (C), (D), (E), and (F), then storing the mixture in the absence of moisture. A preferred method mixes the polymer (A), filler (D), and any filler treating agent or plasticizer, then heats the mixture with stirring to a temperature of greater than 1OO° C. under vacuum or under a nitrogen sweep to thoroughly disperse the filler and to remove any excess moisture. Then the mixture is cooled without exposure to moisture and the crosslinker (B) and catalyst (C) are added without exposing to moisture. Then (E) and (F) are added, again without moisture exposure as silanes will react when exposed to moisture. Preferably (E) and (F) are mixed together before adding to the mixture. The finished mixture is then stored in moisture-proof containers, for example, the common sealant cartridges used to store and apply sealants.

The improved composition of this invention is particuarly useful in the manufacture of modern, glass-walled buildings when it is necessary to obtain reliable sealing of the joints between reflective glass panels on the metal-supporting structures which are generally treated to give a weatherproof surface. The one-part, moisture curing composition gives improved adhesion to a wide variety of substrates and does not result in corrosion of substrates.

The following examples are included for illustrative purposes only and should not be construed as limiting the invention which is properly set forth in the appended claims.

All parts are parts by weight.

EXAMPLE 1

A series of compositions useful as sealants were prepared to determine their adhesion to a variety of substrates.

A base composition was prepared by admixing 30.2 parts of a hydroxyl endblocked polydimethylsiloxane fluid having a viscosity of about 48 Pa .s at 25° C. and a hydroxyl content of about 0.06 percent by weight, 53.4 part of calcium carbonate having a surface treated with calcium stearate, 9 parts of a trimethylsiloxy endblocked polydimethylsiloxane fluid having a viscosity of about 0.1 Pa .s at 25° C. 3.8 parts of fumed silica having a surface area of about 150 m²/g, and 1 part of a hydroxyl endblocked polymethylphenylsiloxane having hydroxyl content of about 4.5 weight percent and a viscosity of about 0.5 Pa .s at 25° C. This mixture was then mixed, in the absence of moisture, with 2.6 parts of a second mixture of 73.5 parts of methyltrimethoxysilane, 24.5 parts of 2,5-diisopropoxy-bis-ethylacetoacetate titanium, and 2 parts of 3-(2-aminoethylamino)-propyltrimethoxy silane. The mixture was then placed under vaccum to remove entrapped air and any volatile materials.

Compositions were then prepared by mixing, in the absence of moisture, 100 parts of the above base with 0.5 part and 1.0 part of additives. Additive A was an epoxy functional silicone fluid having the formula

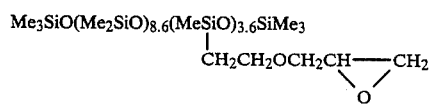

Additive B was an epoxy functional silicone fluid of the formula

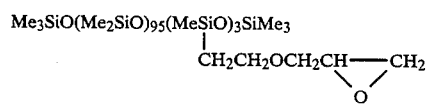

Additive C was an epoxy functional silicone fluid of the formula

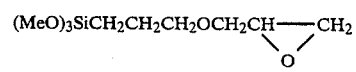

After mixing, each composiion was placed in a sealant cartridge for storage. A seven-day period was allowed for any reaction that might take place to reach equilibrium, then test samples were prepared.

Each sealant sample was tooled onto the substrate shown in Table I into a bead 25 mm wide and 6 mm thick. The beads were allowed to cure undisturbed for 14 days at 23° C. and 50% RH. Adhesion was then evaluated by a tab adhesion test procedure. one inch of the bead was loosed from the substrate by making a knife cut along the substrate at the sealant-substate interface. This tab was then pulled firmly away from the substrate at a 90° angle. If adhesion was acceptable, the sealant would tear cohesively in itself rather than releasing adhesively from the substrate. The area where the bead was pulled free of the substrate was observed and the percent that had cohesive failure was noted as in Table I.

The samples were then placed into room temperature tap water for 1 day and the adhesion was re-evaluated. The sample was returned to the tap water and adhesion was again evaluated after 14 days total in water.

Each sealant sample was also tested for physical properties by tooling a sheet of sealant onto polyethylene coated paper, allowing the sheet to cure for 21 days at standard laboratory conditions, cutting out test samples and testing for durometer in accordance with ASTM D2240, tensile strength and elongation at break in accordance with ASTM D412, and tear strength, die B, in accordance with ASTM D624. The skin-over-time (SOT) and tack-free-time (TFT) of each sealant when exposed to moisture under the standard laboratory conditions were also measured. These results are shown in Table II.

The substrates tested against are representative construction materials such as are found in modern glass and aluminum office buildings. ACT glass is a commercial reflective coated glass from Advanced Coatings Technology consisting of a vacuum spreader applied nickel chromium coating. Duranar is a fluorocarbon finished aluminum from PPG. Both mill finished and anodized aluminum were tested as well as concrete.

The composition containing additive C was the only composition that adhered to the ACT glass substrate. All samples adhered to the anodized aluminum and mill finished aluminum. Additive C gave adhesion to the Duranar substrate at the 0.5 level, while the other additives required the 1 percent level. None of the additives provided successful adhesion to concrete after the 7 day immersion in water.

TABLE II

| Additive | Level | Duro. | Tensile MPa | Elongation | Tear | SOT | TFT |
|---|---|---|---|---|---|---|---|
| A | 0.5% | 30 | 1.38 | 550 | 0.29 | 25 min | 67 min |
|   | 1.0% | 31 | 1.33 | 567 | 0.28 | 32 min | 91 min |
| B | 0.5% | 34 | 1.35 | 440 | 0.29 | 17 min | 48 min |
|   | 1.0% | 33 | 1.36 | 450 | 0.30 | 23 min | 66 min |
| C | 0.5% | 34 | 1.21 | 350 | 0.30 | 31 min | 48 min |
|   | 1.0% | 34 | 1.33 | 420 | 0.30 | 33 min | 58 min |
| Control | — | 37 | 1.39 | 420 | 0.29 | 22 min | 44 min |

Physical Properties shown above.

EXAMPLE 2

A base composition was prepared by admixing 85.6 parts of a mixture of hydroxyl endblocked polydimethylsiloxane with an approximate number average molecular weight of 40,000 with cyclic polydimethylsiloxane with a DP of from 4 to 30, the mixture having a viscosity of about 13.5 Pa.s at 25° C., 4.0 parts of hydroxyl endblocked polymethylphenylsiloxane having a viscosity of about 0.5 Pa.s at 25° C. and about 4.5 weight percent silicon-bonded hydroxyl radicals, 9.5 parts of fume silica having a surface area of about 150 m$^2$/g, and 0.9 part of titanium dioxide pigment. This base composition was then made into a curable sealant by mixing 3.5 parts of the base composition, in the absence of moisture, with 1.8 parts of tetra-isopropyl titanate and 4.7 parts of commercial grade methyltrimethoxysilane. Upon mixing in this manner, the hydroxyl endblocked polydimethylsiloxane spontaneously reacts with the methyl trimethoxysilane to give a polydimethylsiloxane endblocked with methoxy groups, there being predominantly one methyl and two methoxy groups attached to each terminal silicon atom.

A series of compositions were then prepared by adding various silanes to the above sealant, in the absence of moisture. Each of these modified sealants was then evaluated for adhesion to anodized aluminum. Duranar XL (a fluorocarbon treated aluminum), al-clad (aluminum coated 2024-t3 aluminum). and in some cases, glass. The kind and amount of additive used is shown in Table III, based upon 100 parts by weight of sealant. Test samples were prepared as in Example 1 with the initial testing after 7 days cure at room temperature and 50

TABLE I

Tab Adhesion Results

| Additive | Level | | ACT Glass | Duranar | Anodized Al | Mill Al | Concrete |
|---|---|---|---|---|---|---|---|
| A | 0.5% | 14 day R.T. | 0% Coh | 100% Coh | 100% Coh | 100% Coh | 80% Coh |
|   |   | 1 day H$_2$O | 0% Coh | 100% Coh | 100% Coh | 100% Coh | 100% Coh |
|   |   | 7 day H$_2$O | 0% Coh | 50% Coh | 100% Coh | 100% Coh | 100% Coh |
|   | 1.0% | 14 day R.T. | 0% Coh | 100% Coh | 100% Coh | 100% Coh | 100% Coh |
|   |   | 1 day H$_2$O | 0% Coh | 100% Coh | 100% Coh | 100% Coh | 100% Coh |
|   |   | 7 day H$_2$O | 0% Coh | 100% Coh | 100% Coh | 100% Coh | 0% Coh |
| B | 0.5% | 14 day R.T. | 0% Coh | 100% Coh | 100% Coh | 100% Coh | 100% Coh |
|   |   | 1 day H$_2$O | 0% Coh | 30% Coh | 100% Coh | 100% Coh | 20% Coh |
|   |   | 7 day H$_2$O | 0% Coh | 100% Coh | 100% Coh | 100% Coh | 0% Coh |
|   | 1.0% | 14 day R.T. | 0% Coh | 100% Coh | 100% Coh | 100% Coh | 100% Coh |
|   |   | 1 day H$_2$O | 0% Coh | 100% Coh | 100% Coh | 100% Coh | 100% Coh |
|   |   | 7 day H$_2$O | 0% Coh | 100% Coh | 100% Coh | 100% Coh | 0% Coh |
| C | 0.5% | 14 day R.T. | 100% Coh | 100% Coh | 100% Coh | 100% Coh | 100% Coh |
|   |   | 1 day H$_2$O | 100% Coh | 100% Coh | 100% Coh | 100% Coh | 100% Coh |
|   |   | 7 day H$_2$O | 100% Coh | 100% Coh | 100% Coh | 100% Coh | 0% Coh |
|   | 1.0% | 14 day R.T. | 100% Coh | 100% Coh | 100% Coh | 100% Coh | 90% Coh |
|   |   | 1 day H$_2$O | 100% Coh | 100% Coh | 100% Coh | 100% Coh | 50% Coh |
|   |   | 7 day H$_2$O | 100% Coh | 100% Coh | 100% Coh | 100% Coh | 0% Coh |
| Control | — | 14 day R.T. | 0% Coh | 0% Coh | 100% Coh | 100% Coh | 90% Coh |
|   |   | 1 day H$_2$O | 30% Coh | 50% Coh | 100% Coh | 100% Coh | 100% Coh |
|   |   | 7 day H$_2$O | 90% Coh | 100% Coh | 0% Coh | 100% Coh | 0% Coh | percent relative humidity. Additional samples were then immersed in water for 6 days, removed and tested without any time for drying out.

The test results show that the neither the methacrylate functional silane or the epoxy functional silane improved the adhesion over the control sealant, nor did mixtures of these two. When the amine functional additive was added in an amount of 0.25 part per 100 parts of sealant, improved adhesion was obtained. When 0.5 or greater was added, the sealant did not cure properly. When both amine functional and methacrylic functional or epoxy functional silanes were added to the sealant, the sealant did not cure. Mixtures of the amine functional and epoxy functional silanes that were first made, and then added to the sealant gave results which were improvements over the amine alone. The same type of results were seen in the samples that were tested after immersion in water for 6 days. The mixtures of amine and epoxy silanes showed the best adhesion to the variety of substrates tested.

TABLE III

| | | Substrate | | | | | |
|---|---|---|---|---|---|---|---|
| | | Anodized Al. | | Duranar XL | | Al-clad | |
| Additive | Amount | pound | % | pound | % | pound | % |
| Adhesion after 7 day cure at room temperature | | | | | | | |
| none | — | 1.4 | 100 | none | | 1.3 | 0 |
| amine | 0.25 | 5 | 100 | 0.8 | 0 | 4 | 100 |
| | 0.5 | no cure | | | | | |
| | 1.0 | no cure | | | | | |
| methac | 0.5 | 0.5 | 0 | none | | 1 | 0 |
| | 1.0 | 1.3 | 0 | none | | 1 | 0 |
| epoxy | 0.25 | 1.3 | 0 | none | | 1.5 | 0 |
| | 0.5 | 2 | 0 | none | | 4.3–1.5 | 0 |
| | 1.0 | 1.5 | 0 | 0.7 | 0 | 4.2–2.5 | 0 |
| amine + methac | 0.5 | no cure | | | | | |
| | 0.5 | | | | | | |
| amine + epoxy | 0.5 | no cure | | | | | |
| | 0.5 | | | | | | |
| | 1.0 | no cure | | | | | |
| | 1.0 | | | | | | |
| methac + epoxy | 0.5 | 1.5 | 0 | 0.5 | 0 | 1 | 0 |
| | 0.5 | | | | | | |
| mix A | 1.0 | 7.5–6.5 | 100 | 6 | 100 | 4.8 | 45 |
| mix B | 1.0 | 7.5 | 100 | 2 | 0 | 7.4–6.4 | 100 |
| mix C | 0.25 | 5.3 | 100 | 0.6 | 0 | 2.3 | 0 |
| | 0.5 | 7.1 | 100 | 1 | 0 | 3.8–2.2 | 0–30 |
| | 1.0 | 6.5 | 100 | 1.8 | 0 | 5.1 | 100 |
| Adhesion after 7 day cure at room temperature, plus 6 day water immersion | | | | | | | |
| none | — | 2.0 | 0 | none | | 1.4 | 0 |
| amine | 0.25 | 6.5 | 100 | none | | 5 | 100 |
| | 0.5 | no cure | | | | | |
| | 1.0 | no cure | | | | | |
| methac | 0.5 | 0 | | 0 | | 3.3 | 5 |
| | 2.0 | 1 | 0 | none | | 2 | 0 |
| epoxy | 0.25 | 1 | 0 | none | | 4.4 | 2 |
| | 0.5 | 1.5 | 0 | none | | 6 | sc |
| | 1.0 | 1.5 | 0 | none | | 6.2 | sc |
| amine + methac | 0.5 | no cure | | | | | |
| | 0.5 | | | | | | |
| amine + epoxy | 0.5 | | | | | | |
| | 0.5 | | | | | | |
| | 1.0 | no cure | | | | | |
| | 1.0 | | | | | | |
| methac + epoxy | 0.5 | 0 | | 0 | | 5.4 | sc |
| | 0.5 | | | | | | |
| mix A | 1.0 | 6.8 | 100 | 5.6 | 100 | 6.6 | 100 |
| mix B | 1.0 | 8.4 | 100 | 1.5 | 0 | 7.3 | 100 |
| mix C | 0.25 | 5.7 | sc | 0 | | 6 | sc |
| | 0.5 | 8–7 | sc | | | 4.4 | 25 |
| | 1.0 | 7.4 | 100 | 1.2 | 0 | 5.5 | sc | mix A = 0.5 amine and 0.5 epoxy mixed together and then added to the sealant
mix B = 0.5 amine and 0.5 epoxy mixed together and aged 4 days, then added to sealant
mix C = 1 part amine and 1 part epoxy reacted together at 80° C.
sc = failure at the screen reinforcement
amine = 3-(2-aminoethylamino)propyltrimethoxysilane
methac = gamma-methacryloxypropyltrimethoxysilane
epoxy = glycidoxypropyltrimethoxysilane

EXAMPLE 3

A series of compositions were prepared by admixing the curable base of Example 1 with the additives used in Example 2 in the amounts and combinations shown in Table IV. These modified sealants were than evaluated for adhesion in the manner of Example 2, with the results shown in Table IV. The curable base, with no additive, already contains about 0.05 part of the amine additive, added during the manufacture of the curable base.

TABLE IV

| Additive | Amount | Substrate | | | | | | | |
|---|---|---|---|---|---|---|---|---|---|
| | | Anodized Al. | | Duranar XL | | Al-clad | | Glass | |
| | | pound | % | pound | % | pound | % | pound | % |
| *Adhesion after 7 day cure at room temperature* | | | | | | | | | |
| none | — | 24 | 9 | 18–9 | 30 | | | | |
| amine | 0.5 | no cure | | | | | | | |
| | 1.0 | no cure | | | | | | | |
| methac | 0.5 | 15–9 | 40 | 9–5 | 40 | | | 17.2 | tf |
| | 1.0 | 21–9 | 50 | 6 | 30 tf | | | 13–8 | tf |
| epoxy | 0.5 | 22 | 100 | 17 | 60 | | | | |
| | 1.0 | 25 | 100 | 20–16 | 100–50 | | | | |
| amine + methac | 0.5 0.5 | no cure | | | | | | | |
| amine + epoxy | 0.5 0.5 | no cure | | | | | | | |
| methac + epoxy | 0.5 0.5 | 6.4 | tf | 16.8 | tf | | | 6.2 | tf |
| mix A | 1.0 | no cure | | | | | | | |
| mix B | 0.5 | 1.4 | sc | 1.2 | sc | 20 | 100 | | |
| mix C | 1.0 | 6 | 0 | 5 | | | | | |
| *Adhesion after 7 day cure at room temperature, plus 6 day wter immersion* | | | | | | | | | |
| none | — | 25 | 100 | 11.7 | 30 | | | | |
| amine | 0.5 | no cure | | | | | | | |
| | 1.0 | no cure | | | | | | | |
| methac | 0.5 | 10–5 | tf | 4.5 | tf | | | 5.7 | tf |
| | 1.0 | 4 | tf | 4 | tf | | | 5 | tf |
| epoxy | 0.5 | 22 | tf | 13 | 50 | | | | |
| | 1.0 | 24 | 100 | 28 | 100 | | | | |
| amine + methac | 0.5 0.5 | no cure | | | | | | | |
| amine + epoxy | 0.5 0.5 | no cure | | | | | | | |
| methac + epoxy | 0.5 0.5 | 5.7 | tf | 5.8 | tf | | | 12–5 | tf |
| mix A | 1.0 | 4 | sc | 13–5 | sc | | | | |
| mix B | 0.5 | 23 | 100 | 8 | 0 | 24 | 100 | | |
| mix C | 1.0 | 6.6 | 40–0 | 5–3 | tf | | | | | mix A = 0.5 amine and 0.5 epoxy mixed together and then added to the sealant
mix B = 0.5 amine and 0.5 epoxy mixed together and aged 4 days, then added to sealant
mix C = 1 part amine and 1 part epoxy reacted together at 80° C.
sc = failure at the reinforcing screen
tf = thin film left on substrate
amine = 3-(2-aminoethylamino)propyltrimethoxysilane
methac = gamma-methacryloxypropyltrimethoxysilane
epoxy = glycidoxypropyltrimethoxysilane

EXAMPLE 4

A first mixture was prepared by placing 117 g (½ mol) of ingredient (F) in a container, and adding dropwise 111 g (½ mol) of ingredient (E) with stirring. After 10 ml was added, the container was heated to 80° C. with a heating bath and addition continued, taking 1 hour to complete the addition. The mixture was held at temperature for 2.5 hours additional and then cooled.

A second mixture was prepared in a similar manner, except the ingredient (E) was placed in the container and ingredient (F) was added to it.

A third mixture was prepared as in the second mixture, except 74 g (⅓ mol) of ingredient (E) was placed into the container and 155 g (⅔ mol) of ingredient (F) was added to it.

A series of sealants were then prepared by mixing ¾ percent by weight of each of the above mixtures into the base composition of Example 1. The base composition contains 0.17 part of ingredient (E) per 100 parts of ingredient (A).

Each sealant was then tooled onto a Duranar substrate and tested in the manner described in Example 1, with the results shown in Table V.

TABLE V

| Additive | | | | |
|---|---|---|---|---|
| first | x | | | |
| second | | x | | |
| third | | | x | |
| none | | | | x |
| Adhesion, after | | | | |
| 14 days cure | 100% Coh | 100% Coh | 100% Coh | 10% Coh |
| plus 1 day H₂O | 100 | 100 | 75 | 10 |
| plus 7 day H₂O | 100 | 98 | 65 | 10 |
| Adhesion, after | | | | |
| 14 days cure | 21.5 lbs | 22 lbs | 20.8 lbs | 6.5 lbs |
| plus 1 day H₂O | 23.5 | 25 | 18 | 7 |
| plus 7 day H₂O | 28 | 23 | 21 | 7 |

EXAMPLE 5

The above example 4 was repeated, except a triethoxysilyl-ethylene ended polydimethylsiloxane having a viscosity of about 40 Pa.s was used in place of the hydroxy endblocked polydimethylsiloxane.

Each of these sealants was then tooled onto a mill aluminum substrate and tested as above, with the results shown in Table VI.

TABLE VI

| Additive | | | | |
|---|---|---|---|---|
| first | x | | | |
| second | | x | | |
| third | | | x | |
| none | | | | x |

TABLE VI-continued

| | Sample 1 | Sample 2 | Sample 3 | Sample 4 |
|---|---|---|---|---|
| Adhesion, after | | | | |
| 14 days cure | 100% Coh | 100% Coh | 100% Coh | 2% Coh |
| plus 1 day H₂O | 95 | 80 | 30 | 0 |
| plus 7 day H₂O | 100 | 100 | 100 | 3 |
| Adhesion, after | | | | |
| 14 days cure | 14.5 lbs | 14 lbs | 13 lbs | 7 lbs |
| plus 1 day H₂0 | 14 | 12 | 10 | 6 |
| plus 7 day H₂O | 15 | 13 | 9 | 7 |

EXAMPLE 6

A series of sealants were prepared to illustrate the unique composition which is herein claimed. These are comparative compositions.

A base composition was prepared by mixing 1000 g of trimethoxysilylethylene endblocked polydimethylsiloxane having a viscosity of about 40 Pa.s at 25° C. with 170 g of fumed silica having the surface treated with hexamethyldisilazane.

The series of sealants were then prepared by placing 150 g of the above base in a tube and admixing 2.56 g of methyltrimethoxysilane crosslinker, 0.26 g of the catalyst shown in Table VI, and 1.28 g of the adhesion additive shown in Table VI. The catalyst used was either tetrabutyltitanate (TBT). dibutyltindiacetate (DBTDA), or 2.5-diisopropoxy-bis-ethylacetoacetate titanium (TDIDE). The adhesion additives were ingredient (E) of this invention or a mixture of ingredients (E) and (F) of this invention. After all of the series had been prepared, a bead of each was extruded onto a surface and the cure of the sample evaluated by measuring the skin over time (SOT) and tack free time (TFT). The skin over time is defined as the time required for the sealant to cure upon exposure to standard laboratory atmosphere (23° C. and 50 percent relative humidity) to the point where a finger can be placed lightly upon the surface and withdrawn without material sticking to the finger. The tack free time is defined as the time required for the sealant to cure upon exposure to standard laboratory atmosphere to the point where a strip of polyethylene can be lightly pressed onto the sealant surface and then pulled off at a 180 angle without material sticking to the polyethylene.

TABLE VI

| | Sample | | | | | |
|---|---|---|---|---|---|---|
| | 1 | 2 | 3 | 4 | 5 | 6 |
| DBTDA, g | 0.26 | | | 0.26 | | |
| TBT, g | | 0.26 | | | | |
| TDIDE, g | | | 0.26 | | 0.26 | 0.26 |
| Ingred. (E), g | 1.28 | 1.28 | 1.28 | 0.65 | 0.65 | |
| Ingred. (F), g | | | | 0.65 | 0.65 | |
| SOT, min. | 8 | 68 | 39 | 11 | 60 | 18 |
| TFT, min. | 18 | | | 11 | 357 | |
| hrs. | | 23 | 24 | | | 24 |

Samples 1, 4, and 6 cured into elastomers upon cure for 7 days. Samples 2, 3, and 5 never cured to an elastomer.

That which is claimed is:

1. A composition consisting essentially of a product obtained by mixing
   (A) 100 parts by weight of a hydroxyl or alkoxy endblocked polydiorganosiloxane having viscosity of between 1.0 and 100 Pa.s at 25° C. the organic groups being selected from the group consisting of methyl, ethyl, propyl, phenyl, and trifluoropropyl.
   (B) from 0.35 to 9.0 parts by weight of an alkyltrialkoxysilane of the formula RSi(OR')₃ where R is a monovalent hydrocarbon radical of from 1 to 4 carbon atoms and R is an alkyl or alkoxyalkyl radical.
   (C) from 0.5 to 5.0 parts by weight of titanium catalyst such that there is from 0.05 to 0.94 part of titanium.
   (D) from 0 to 250 parts by weight of filler,
   (E) silane of the formula

   (MeO)₃SiCH₂CH₂CH₂NHCH₂CH₂NH₂ in an amount such that there is from 0.1 to 1.0 mole of silane per mole of titanium in (C), and
   (F) silane of the formula

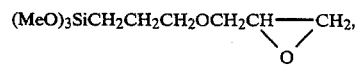

an amount such that there is at least 25 percent on a molar basis of the amount of (E) present, and less than about 5 percent by weight based upon the weight of (A).

2. The composition of claim 1 in which (A) is an alkoxy endblocked polydiorganosiloxane.

3. The composition of claim 1 in which (A) is trialkoxysilylethylene ended polydiorganosiloxane.

4. The composition of claim 1 in which the organic groups of (A) are methyl.

5. The composition of claim 1 in which R' is methyl or ethyl.

6. The composition of claim 4 in which (B) is methyltrimethoxysilane.

7. The composition of claim 6 in which the viscosity of (A) is between 40 and 60 Pa.s at 25° C.

8. The composition of claim 4 in which (B) is 4 to 8 parts by weight of methyltrimethoxysilane.

9. The composition of claim 4 in which (D) is from 10 to 200 parts by weight.

10. The composition of claim 4 in which (E) is from 0.1 to 0.75 mole per mole of titanium in (C).

11. The composition of claim 4 in which (F) is at least 0.75 mole per mole of (E).

12. The composition of claim 1 in which the viscosity of (A) is from 40 to 60 Pa.s at 25° C., (B) is from 4 to 8 parts by weight, (D) is from 10 to 200 parts by weight, (E) is from 0.1 to 0.75 mole per mole of titanium in (C) and (F) is at least 0.75 mole per mole of (E) and less than 2 parts by weight of (A).

13. The composition of claim 1 in which (E) and (F) are only present as a pre-reacted mixture which is prepared by mixing them together before addition to the rest of the ingredients.

14. The composition of claim 13 in which (E) and (F) are present in equal molar quantities.

15. A method of producing a one-part silicone sealant curable on exposure to moisture having improved adhesion to a variety of substrates when cured consisting essentially of mixing, in the absence of moisture,
   (A) 100 parts by weight of a hydroxyl or alkoxy endblocked polydiorganosiloxane having viscosity of between 1.0 and 100 Pa.s at 25° C. the organic groups being selected from the group consisting of methyl, ethyl, propyl, phenyl, and trifluoropropyl.
   (B) from 0.35 to 9.0 parts by weight of an alkyltrialkoxysilane of the formula RSi(OR')₃ where R is a monovalent hydrocarbon radical of from 1 to 4 carbon atoms and R' is an alkyl or alkoxyalkyl radical.

(C) from 0.5 to 5.0 parts by weight of titanium catalyst such that there is from 0.05 to 0.94 part of titanium,
(D) from 0 to 250 parts by weight of filler,
(E) silane of the formula $(MeO)_3SiCH_2CH_2CH_2NHCH_2CH_2NH_2$ in an amount such that there is from 0.1 to 1.0 mole of silane per mole of titanium in (C), and
(F) silane of the formula

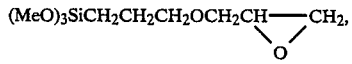

in an amount such that there is at least 25 percent on a molar basis of the amount of (E) present, and less than about 5 percent by weight based upon the weight of (A).

then storing in the absence of moisture, to yield a sealant material that cures upon exposure to moisture and bonds to a large variety of substrates when cured.

16. The method of claim 15 in which the viscosity of (A) is between 40 and 60 Pa.s at 25° C., (B) is from 4 to 8 parts by weight, (D) is from 10 to 200 parts by weight, (E) is from 0.1 to 0.75 mole per mole of titanium in (C), and (F) is at least 0.75 mole per mole of (E) and less than 2 parts by weight of (A).

17. The method of claim 15 in which (E) and (F) are only present as a pre-reacted mixture which is prepared by mixing them together before addition to the rest of the ingredients.

* * * * *